United States Patent Office 2,890,251
Patented June 9, 1959

2,890,251
CATALYTIC REACTOR

Thomas C. Flavin and John L. Groebe, Bartlesville, Okla., assignors to Phillips Petroleum Company, a corporation of Delaware Application June 6, 1956, Serial No. 589,635

10 Claims. (Cl. 260—666)

This invention relates to a catalytic reactor, more particularly a reactor suitable for use in the conversion of hydrocarbons in the presence of aluminum halide catalysts.

Aluminum halide catalysts have been used in numerous processes for the conversion of hydrocarbons, including isomerization of low boiling hydrocarbons and alkylation of alkylatable hydrocarbons, including normal paraffins, cycloparaffins, and aromatic hydrocarbons. In such processes, an important type of operation is one in which the aluminum halide catalyst is actually a complex of said halide with an organic compound. The more useful of these liquid complexes are those formed with normally liquid paraffin hydrocarbons boiling in the boiling range of those fractions generally identified as kerosene and gasoline.

A difficulty in working with such complex catalysts is their high viscosities. For instance, in a process wherein diisopropyl is prepared by reacting isobutane with ethylene, a catalyst viscosity of 100 to 200 centistokes is encountered. In an isomerization reaction wherein cyclohexane is produced, viscosities of 700 to 800 centistokes are frequently encountered and the viscosity of the catalyst complex may exceed 4,000 centistokes.

These high viscosities have introduced difficulties in the design of the apparatus for carrying out reactions of this type and our invention is directed to apparatus suitable for such reactions. Our improvement comprises using separate shafts for the mixing means and for the pumping impeller.

Figure 1:
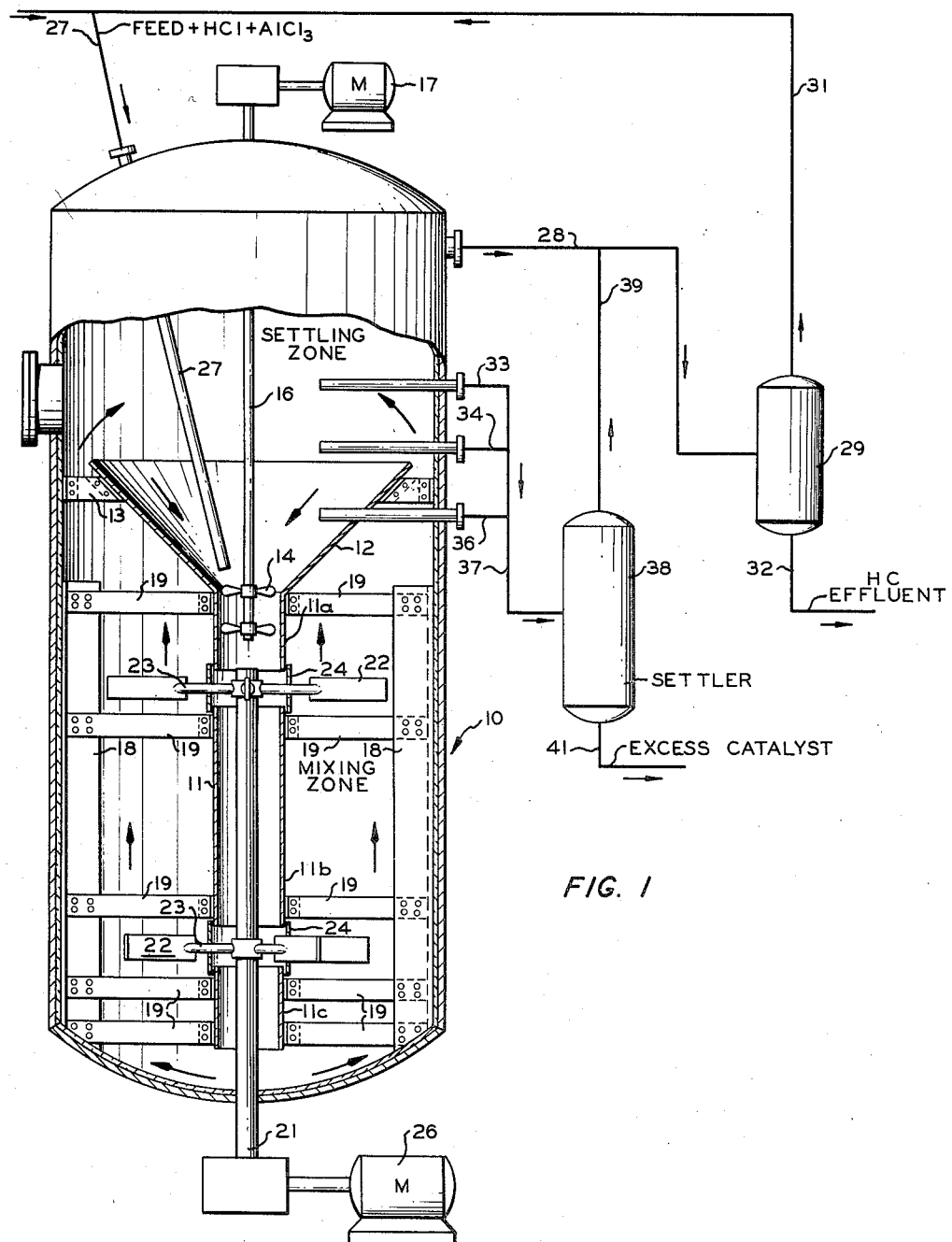
Figure 2:
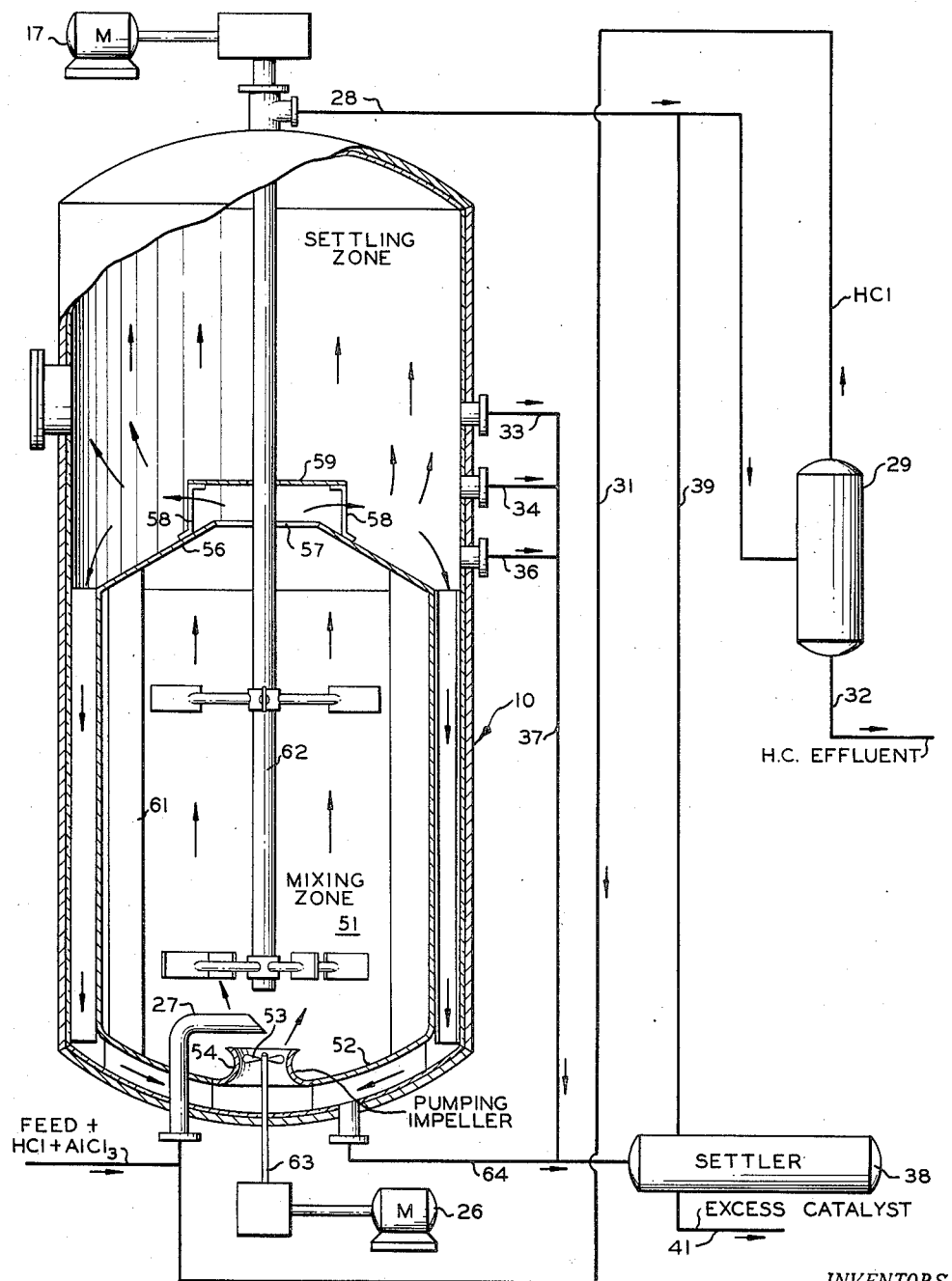

Accompanying and forming a part of this application is a drawing comprising:

Figure 1, an elevational view, partly in section, of the improved reactor of our invention including a schematic diagram of certain associated apparatus; and Figure 2, a modification of the apparatus shown in Figure 1.

The following are objects of our invention.

An object of our invention is to provide an improved catalytic reactor.

A further object of our invention is to provide an improved catalytic reactor adapted for use in isomerization and alkylation reactions using aluminum halide hydrocarbon complex catalysts. A further object of our invention is to provide a catalytic reactor provided with impelling means and agitation means separately supported and driven so that no sacrifice in design efficiency is required.

Other objects and advantages of this invention will be apparent to one skilled in the art upon reading the accompanying disclosure including the aforementioned drawings.

In the reactions described, aluminum chloride is the halide which is most generally used in the practice of our invention although it is not outside of the broadest concepts of the invention to use other aluminum halides, particularly aluminum bromide. While aluminum fluoride generally does not give satisfactory results, mixed halides such as $AlCl_2F$, $AlClF_2$, $AlBr_2F$, and the like, may often be used successfully. Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 percent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosene. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. Two general types of catalyst have been prepared. These may be characterized as high-aluminum halide and low-aluminum halide types. When preparing a catalyst with aluminum chloride the high-aluminum chloride type contains 80 to 85 percent by weight of aluminum chloride and is a yellow highly viscous material. The low-aluminum chloride type contains about 50 to 65 percent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways as by adding aluminum halide directly to recirculated catalyst or by dispersing aluminum halide in one of the streams charged to the reaction zone. This can be done by suspending granular aluminum halide in one of the streams or by dissolving aluminum chloride at elevated temperatures in one of them. The liquid complex should not be contaminated with water or other reactive, oxygen-containing compounds.

In the accompanying drawing, common numerals being used in Figures 1 and 2 so far as possible, the reactor is indicated, generally, as 10. Now directing attention to Figure 1, this reactor 10, comprising a substantially vertically disposed vessel, is provided with an open ended substantially vertically disposed tube 11 having a funnel shaped member 12 supported by brackets 13 at the upper end thereof. Tube 11, which functions as a draft tube, actually comprises 3 separate sections, 11a, 11b, and 11c, but for practical purposes, this can be considered one tube since a continuous passage from the lower end of funnel 12 to a point near the bottom of vessel 10 is provided. As will be seen subsequently, the agitator shaft extends through this tube and it is necessary to provide additional tubes to close the portion of tube 11 through which the agitator plate arms extend. An impeller 14 is provided in the upper end of tube 11, this impeller, which can consist of a plurality of blades, is supported by and driven by shaft 16 suitably connected to motor 17. The inner wall of vessel 10 is provided with outwardly extending projections 18, four of these being provided in the particular apparatus shown although more or less than this can be used. Attached to these projections 18 are a series of brackets 19, provided to support tube 11. Shaft 21 is provided extending upwardly in tube 11 and a plurality of paddle members 22 are attached to shaft 21 by means of arms 23. Arms 23 are provided with covers 24, these covers extending between the portions of tube 11 in order to close substantially the space between these separate portions and to provide for substantially no liquid flow there between. Shaft 21 is suitably driven by motor 26.

Extending into vessel 10 is a feed conduit 27, this conduit extending preferably to a point near impeller 14. Extending from the upper end portion of vessel 10 is an effluent conduit 28, this conduit extending to a fractionator 29. A conduit 31 extends from the upper end portion of fractionator 29 to conduit 27. Extending from the lower end portion of fractionator 29 is product conduit 32. Extending from a point in vessel 10 at a point in proximity to funnel 12 are a series of conduits 33, 34 and 36, these conduits being connected to conduit 37 which communicates with a settler 38. Extending from the upper end portion of settler 38 to conduit 28 is conduit 39 and extending from the lower end portion of settler 38 is conduit 41.

Figure 2 shows substantially the same apparatus although there are certain fundamental differences. In this modification, the inner zone of vessel 10 is made up of an inner vessel 51, the bottom of this vessel 52 having the impeller 53 located in an upwardly extending inner tube 54. The upper end of inner vessel 51 is provided with an upwardly extending wall 56, having outlet hole 57, therein. Attached to upwardly extending wall 56 by means of brackets 58 is a baffle or deflection plate 59. Vessel 51 is also provided with outwardly extending projections 61. In this modification, agitator 62 extends downwardly from the top of vessel 10 and is provided with agitator plates as is the agitator in Figure 1. In Figure 2, the impeller 53, mounted on shaft 63 extends through the bottom of vessel 10. Vessel 10 can be provided with a drain line, shown as 64 in Figure 2.

From the above description of the figures, an important advantage of the apparatus is at once evident. Entirely different factors are involved in the design of the agitator and in the design of the impeller. Close clearances are used in the design of the impeller and it operates at relatively high speeds, broadly in the range of 300 to 1,200 r.p.m. and, in the applications mentioned, preferably in the range of 600 to 800 r.p.m. The agitator, whose principal function is to direct the material in the reaction vessel outwardly from the center therefrom and against the outwardly extending vertical projections in order to subdivide catalyst to a high degree, need rotate much more slowly and close clearances are not involved even though a high degree of agitation is provided. Broadly, the rotational speed of the agitator is in the range of 40 to 200 r.p.m., although the narrower range of 75 to 125 r.p.m. is most common. Previous attempts have been made to obtain the combination flow patterns in similar reactors by mounting both the impeller and the agitator on a common shaft but in our work this has not been satisfactory. This is due primarily to the differences in effect desired. A certain amount of "whipping" has been present when both are mounted on a common shaft, limiting the clearance between the impeller and tube.

This invention also represents and makes possible a new mode of operation for the alkylation and isomerization reactions. Previously, the process has been carried out by introducing the reactants into the reactor, vigorously agitating this reaction zone, and withdrawing a mixture of the hydrocarbons and the catalyst. This mixture was introduced into a catalyst settler and the hydrocarbon product was taken overhead and the catalyst complex returned to the reaction zone. Such operation produced many difficult problems due to the high viscosity of the catalyst and rigid design was required for this return. Large pipes are needed and pumps to handle such material are very expensive and, when the viscosity rises too high, simply will not pump the catalyst. This difficulty has resulted in a concerted attempt by workers in the art to control the viscosity within narrow limits and has necessitated the withdrawal from the stream of otherwise suitable catalysts in plant operation. Also, as is well known in the art, the catalyst used in these reactions is extremely corrosive, thus introducing another difficulty when extensive piping and pumping is involved.

By the use of our apparatus the reaction can be carried out in the single reactor and, at the same time, no extensive handling of the catalyst is involved. By circulating the reaction mixture vertically in reactor 10 while, at the same time, subjecting it to vigorous agitation, the reaction takes place within the lower portion of the reaction zone. The upper portion of the reaction zone, being non-agitated or substantially quiescent, functions as a catalyst settling zone and the hydrocarbon stream leaving the upper portion thereof does not contain entrained catalyst. When it is desired to remove a portion of the catalyst, it is done at an intermediate zone in the reactor and conveyed to a settler where a separation can be made between the hydrocarbon and catalyst phases. Then it is only necessary to handle a small amount of catalyst, that which is being discarded.

In the operation of this apparatus, the feed is introduced into the reaction zone near the pumping impeller, this being done to obtain better dispersion of the components of this feed. Accompanying this feed is a recycle stream containing a hydrocarbon and hydrochloric acid mixture. The components of the feed containing such aluminum halide catalyst as is necessary can be supplied by methods well known in the art. The effluent from the reaction zone is passed to a fractionator wherein hydrochloric acid and some hydrocarbons are removed from this effluent stream and returned to the reaction zone. The kettle product from this stripper, treated as necessary, is the product of the process.

One specific field in which this invention is applicable is in the production of diisopropyl from isobutane and ethylene. Specifically, an olefin feed having the following composition:

| Component: | Mols |
|---|---|
| Methane | 1,924 |
| Ethylene | 5,610 |
| Ethane | 1,463 |
| Propylene | 2,002 |
| Propane | 288 |
| Butylene | 118 |
| Isobutane | 3,835 |
| Normal butane | 264 | in an amount of 154,588 gallons per day and in an isobutane stream of the following composition:

| Component: | Mols |
|---|---|
| Ethane | 554 |
| Propane | 1,359 |
| Isobutane | 23,325 |
| Normal butane | 1,401 | in an amount of 324,979 gallons per day is fed to the reactor. In this reactor, these feed streams are reacted to produce a product of the following composition:

| Component: | Mols |
|---|---|
| Methane | 1,924 |
| Ethylene | 600 |
| Ethane | 2,017 |
| Propane | 1,647 |
| Isobutane | 20,996 |
| Normal butane | 1,655 | and 100,594 gallons per day of alkylate ($C_5$ and higher), the total effluent being 435,000 gallons per day. In the reactor the ratio of catalyst sludge (containing 57 percent aluminum chloride) to hydrocarbon is 0.165 and the hydrochloric acid concentration is within the range of 0.01 to 0.02 percent on a weight basis. In order to supply this amount of aluminum chloride and hydrochloric acid it is necessary to supply, with the feed, 7,000 pounds per day of aluminum chloride, and 200 pounds per day of hydrochloric acid. Discarded are 12,300 pounds per day of catalyst sludge containing the aforementioned 57 percent aluminum chloride. Of course, it will be realized that there is a considerable recirculation of the hydrocarbon effluent including unreacted materials. The reaction is carried out at a temperature of 100 to 200° F., preferably about 120° F.

The apparatus is likewise applicable to the isomerization of hydrocarbons to produce other hydrocarbons, one of the most important of these operations at the present time being the isomerization of a hydrocarbon stream to produce cyclohexane. This apparatus can be so used and the following material balance represents operation of such a process.

Table I

|  | Fresh Feed, Gallons | Feed to Reactor | | Reactor Effluent, Gallons | HCl Recycle | | Product, Gal. |
|---|---|---|---|---|---|---|---|
|  |  | Mol Percent | Gal. |  | Mol Percent | Gal. |  |
| HCl | 0 | 3.75 | 19,042 | 19,043 | 70.34 | 19,042 | 1 |
| Propane | 54 | 1.07 | 5,410 | 5,409 | 19.78 | 5,356 | 53 |
| Butane | 0 | 0.13 | 659 | 719 | 2.44 | 659 | 160 |
| 2,2-dimethylbutane | 0 | 0.05 | 237 | 47,430 | 0.88 | 237 | 47,193 |
| 2,3-dimethylbutane | 144 | 0.06 | 317 | 34,594 | 0.64 | 173 | 34,421 |
| 2-methylpentane | 13,335 | 2.72 | 13,787 | 89,369 | 1.67 | 452 | 89,917 |
| 3-methylpentane | 48,218 | 9.56 | 48,525 | 61,478 | 1.13 | 307 | 61,171 |
| Normal hexane | 312,544 | 61.72 | 313,259 | 140,976 | 2.60 | 705 | 140,271 |
| Methylcyclopentane | 7,710 | 17.29 | 87,769 | 19,749 | 0.22 | 59 | 19,690 |
| 2,2-dimethylpentane | 629 | 0.12 | 629 | 628 |  |  | 628 |
| 2,4-dimethylpentane | 439 | 0.09 | 439 | 438 |  |  | 438 |
| Cyclohexane | 17,405 | 3.44 | 17,473 | 81,259 | 0.30 | 84 | 81,175 |
| 3,3-dimethylpentane | 11 |  | 11 | 11 |  |  | 11 |
| Heavies | 3,950 |  | 3,950 | 3,950 |  |  | 3,950 |
| Gal./day | 404,449 |  | 511,507 | 505,053 |  | 24,074 | 479,079 |

In the reactor the ratio of catalyst (containing 62 percent aluminum chloride) to hydrocarbon is 0.66 and the concentration of hydrochloric acid in the reactor is maintained at 5.8 percent acid by weight. For these conditions, it is necessary to add approximately 7,000 pounds per day of aluminum chloride and 1,760 pounds per day of hydrochloric acid.

As many possible embodiments may be made of this invention without departing from the scope thereof, it is to be understood that all matter herein set forth or shown in the accompanying drawings is to be interpreted as illustrative and not in a limiting sense.

We claim:

1. Apparatus for carrying out catalytic reactions comprising a substantially vertically disposed vessel; an open ended substantially vertically disposed stationary tube within the lower portion of said vessel; a pumping impeller adapted to circulate liquid vertically through said tube; a mixing means adapted to maintain liquid within the lower portion of said vessel in a state of agitation said mixing means being supported and driven separately from said impeller; a feed conduit to said vessel, said conduit terminating in proximity to said pumping impeller; an effluent conduit extending from the upper portion of said vessel; a settler; a plurality of removal conduits extending from said vessel adjacent the upper end of said tube to said settler; a conduit extending from the upper portion of said settler to said effluent conduit; and a discharge conduit extending from the lower portion of said settler.

2. Apparatus for carrying out catalytic reactions comprising a substantially vertically disposed vessel; an open ended substantially vertically disposed stationary tube positioned within said vessel; an outwardly flaring funnel shaped member attached to the upper end of said tube; a pumping impeller adapted to circulate liquid downwardly through said tube; mixing means adapted to maintain liquid within the lower portion of said vessel in a state of agitation, said mixing means being supported and driven separately from said impeller; a feed conduit to said vessel, said conduit terminating in proximity to said pumping impeller; an effluent conduit extending from the upper portion of said vessel; a settler; a plurality of removal conduits extending from said vessel adjacent the upper end of said tube to said settler; a conduit extending from the upper portion of said settler to said effluent conduit; and a discharge conduit extending from the lower portion of said settler.

3. Apparatus for carrying out catalytic reactions comprising a substantially vertically disposed vessel; an open ended substantially vertically disposed stationary tube within the lower portion of said vessel; a pumping impeller adapted to circulate liquid upwardly through said tube; mixing means adapted to maintain liquid within the lower portions of said vessel in a state of agitation, said mixing means being supported and driven separately from said impeller; a feed conduit to said vessel, said conduit terminating in proximity to said pumping impeller; an effluent conduit extending from the upper portion of said vessel; a settler; a plurality of removal conduits extending from said vessel adjacent the upper end of said tube to said settler; a conduit extending from the upper portion of said settler to said effluent conduit; and a discharge conduit extending from the lower portion of said settler.

4. In the method of carrying out hydrocarbon conversions in the presence of an aluminum halide catalyst, the improvement comprising effecting the reaction in a substantially vertically disposed reaction zone; circulating the reaction mixture vertically in the lower portion of said zone and simultaneously but independently vigorously agitating said reaction mixture in the lower portion of said reaction zone; maintaining a non-agitated zone in the upper portion of said reaction zone to permit settling of said aluminum halide catalyst from the hydrocarbon phase; removing a hydrocarbon phase substantially free of catalyst from the upper end portion of said reaction zone, removing a portion of the reaction mixture from at least one of a plurality of possible levels in the reaction zone, and separating catalyst from said portion.

5. The method of claim 4 wherein the hydrocarbon conversion comprises the production of diisopropyl by reacting isobutylene and ethylene in the presence of an aluminum chloride catalyst.

6. The method of claim 4 wherein the hydrocarbon conversion comprises the production of cyclohexene from methylcyclopentane in the presence of an aluminum chloride catalyst.

7. In the method of carrying out hydrocarbon conversions in the presence of an aluminum halide catalyst, the improvement comprising effecting the reaction in a substantially vertically disposed reaction zone; circulating the reaction mixture in the lower portion of said reaction zone downwardly substantially along the axis of said zone and simultaneously but independently vigorously agitating said reaction mixture in the lower portion of said reaction zone; maintaining a non-agitated zone in the upper portion of said reaction zone to permit settling of said aluminum halide catalyst from the hydrocarbon phase; removing a hydrocarbon phase substantially free of catalyst from the upper end portion of said reaction zone, removing a portion of the reaction mixture from at least one of a plurality of possible levels in the reaction zone, and separating catalyst from said portion.

8. In the method of carrying out hydrocarbon conversions in the presence of an aluminum halide catalyst, the improvement comprising effecting the reaction in a substantially vertically disposed reaction zone; circulating the reaction mixture in the lower portion of said reaction zone upwardly substantially along the axis of said zone and simultaneously but independently vigorously agitating said reaction mixture in the lower portion of said reaction zone; maintaining a non-agitated zone in the upper portion of said reaction zone to permit settling of said aluminum halide catalyst from the hydrocarbon phase; removing a hydrocarbon phase substantially free of catalyst from the upper end portion of said reaction zone, removing a portion of the reaction mixture from at least one of a plurality of possible levels in the reaction zone, and separating catalyst from said portion.

9. Apparatus for carrying out catalytic reactions comprising a substantially vertically disposed vessel; an open ended substantially vertically disposed stationary tube positioned within said vessel; a pumping impeller positioned within and adapted to circulate liquid downwardly through said tube; mixing means adapted to maintain liquid within the lower portion of said vessel in a state of agitation, said mixing means being supported and driven separately from said impeller and comprising a plurality of paddle members adjacent and outside of said vertically disposed tube; a feed conduit to said vessel, said conduit extending from the upper portion of said vessel; a settler; a plurality of removal conduits extending from said vessel adjacent the upper end of said tube to said settler; a conduit extending from the upper portion of said settler to said effluent conduit; and a discharge conduit extending from the lower portion of said settler.

10. Apparatus for carrying out catalytic reactions comprising a substantially vertically disposed vessel; an open ended substantially vertically disposed tube positioned within said vessel, said tube comprising at least two vertically separated sections; a pumping impeller adapted to circulate liquid downwardly through said tube; mixing means driven separately from said pumping impeller adapted to maintain liquid within the lower portion of said vessel in a state of agitation, said mixing means comprising a drive shaft extending upwardly within said vertically disposed tube, a plurality of arms attached to said drive shaft, said arms terminating in paddle members positioned externally of said vertically disposed tube; a cover attached to said arms, said cover adapted to close substantially the space between vertically separated sections, a feed conduit to said vessel, said conduit terminating in proximity to said pumping impeller; an effluent conduit extending from the upper portion of said vessel; a settler; a plurality of removal conduits extending from said vessel adjacent the upper end of said tube to said settler; a conduit extending from the upper portion of said settler to said effluent conduit; and a discharge conduit extending from the lower portion of said settler.

References Cited in the file of this patent

UNITED STATES PATENTS

| Re. 23,151 | Shiras | Sept. 20, 1949 |
| 2,006,449 | Gallagher | July 2, 1935 |
| 2,134,571 | Morlock | Oct. 25, 1938 |
| 2,459,636 | Fenney | Jan. 18, 1949 |
| 2,507,105 | Howard | May 9, 1950 |
| 2,677,000 | Russum | Apr. 27, 1954 |
| 2,747,003 | Kilpatrick | May 22, 1956 |